United States Patent
Ishii et al.

(10) Patent No.: US 9,573,645 B2
(45) Date of Patent: Feb. 21, 2017

(54) MOTORCYCLE

(71) Applicant: KAWASAKI JUKOGYO KABUSHIKI KAISHA, Kobe-shi, Hyogo (JP)

(72) Inventors: Hiroshi Ishii, Kobe (JP); Tomo Yamamoto, Kobe (JP); Daisuke Saeki, Kakogawa (JP); Toshiyuki Kimura, Motosu (JP); Seiichi Sonoda, Gifu (JP); Akira Yoshida, Hozumi (JP); Manabu Morikawa, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 14/769,521

(22) PCT Filed: Nov. 15, 2013

(86) PCT No.: PCT/JP2013/006730
§ 371 (c)(1),
(2) Date: Aug. 21, 2015

(87) PCT Pub. No.: WO2015/071934
PCT Pub. Date: May 21, 2015

(65) Prior Publication Data
US 2016/0016623 A1     Jan. 21, 2016

(51) Int. Cl.
*B62J 17/00* (2006.01)
*B62J 17/02* (2006.01)
(Continued)

(52) U.S. Cl.
CPC .............. *B62J 17/00* (2013.01); *B60K 11/08* (2013.01); *B62J 17/02* (2013.01); *B62J 99/00* (2013.01)

(58) Field of Classification Search
CPC ............. B62J 17/00; B62J 17/02; B60K 11/08
(Continued)

(56) References Cited

U.S. PATENT DOCUMENTS 4,887,688 A * 12/1989 Horiike ................. B62K 11/04
                                                            180/219
6,745,863 B2 * 6/2004 Kanda ..................... F01N 13/08
                                                            180/219
(Continued)

FOREIGN PATENT DOCUMENTS

JP    50152448 A    12/1975
JP    6057481 U     4/1985
(Continued)

OTHER PUBLICATIONS

ISA Japanese Patent Office, International Search Report Issued in Application No. PCT/JP2013/006730, Feb. 18, 2014, WIPO, 2 pages.

*Primary Examiner* — Anne Marie Boehler
*Assistant Examiner* — Michael Stabley
(74) *Attorney, Agent, or Firm* — Alleman Hall McCoy Russell & Tuttle LLP

(57) ABSTRACT

A motorcycle of the present invention comprises a vehicle body; and a protruding section which is mounted to the vehicle body such that the protruding section protrudes from the vehicle body to at least one of right and left, and the protruding section has a structure which causes air to flow from front to back along an upper surface of the protruding section to generate a force for pushing the vehicle body downward.

12 Claims, 7 Drawing Sheets

(51) Int. Cl.
 *B60K 11/08* (2006.01)
 *B62J 99/00* (2009.01)
(58) Field of Classification Search
 USPC .......................................................... 180/229
 See application file for complete search history.

(56) References Cited

U.S. PATENT DOCUMENTS

| | | | | |
|---|---|---|---|---|
| 7,448,461 B2* | 11/2008 | Misaki | ..................... | B62J 17/02 |
| | | | | 180/229 |
| 7,503,609 B2* | 3/2009 | Misaki | ..................... | B62J 9/00 |
| | | | | 296/37.1 |
| 7,586,406 B2* | 9/2009 | Kondo | ..................... | B62J 6/001 |
| | | | | 340/471 |
| 7,686,369 B2* | 3/2010 | Matsuo | ..................... | B62J 17/04 |
| | | | | 296/78.1 |
| 8,104,936 B2* | 1/2012 | Li | ..................... | B60Q 1/0005 |
| | | | | 296/78.1 |
| 8,517,449 B2* | 8/2013 | Okubo | ..................... | B62J 17/00 |
| | | | | 296/78.1 |
| 2007/0256882 A1* | 11/2007 | Bedard | ..................... | B62K 5/027 |
| | | | | 180/312 |
| 2014/0091596 A1* | 4/2014 | Maeda | ..................... | B62D 25/081 |
| | | | | 296/192 |
| 2014/0092613 A1* | 4/2014 | Maeda | ..................... | F02M 35/10013 |
| | | | | 362/476 |

FOREIGN PATENT DOCUMENTS

| | | |
|---|---|---|
| JP | 62178285 U | 11/1987 |
| JP | 05170157 A | 7/1993 |
| JP | 09240540 A | 9/1997 |
| JP | 11342883 A | 12/1999 |
| JP | 2005088641 A | 4/2005 |
| JP | 2006281949 A | 10/2006 |
| JP | 2010228553 A | 10/2010 |

\* cited by examiner

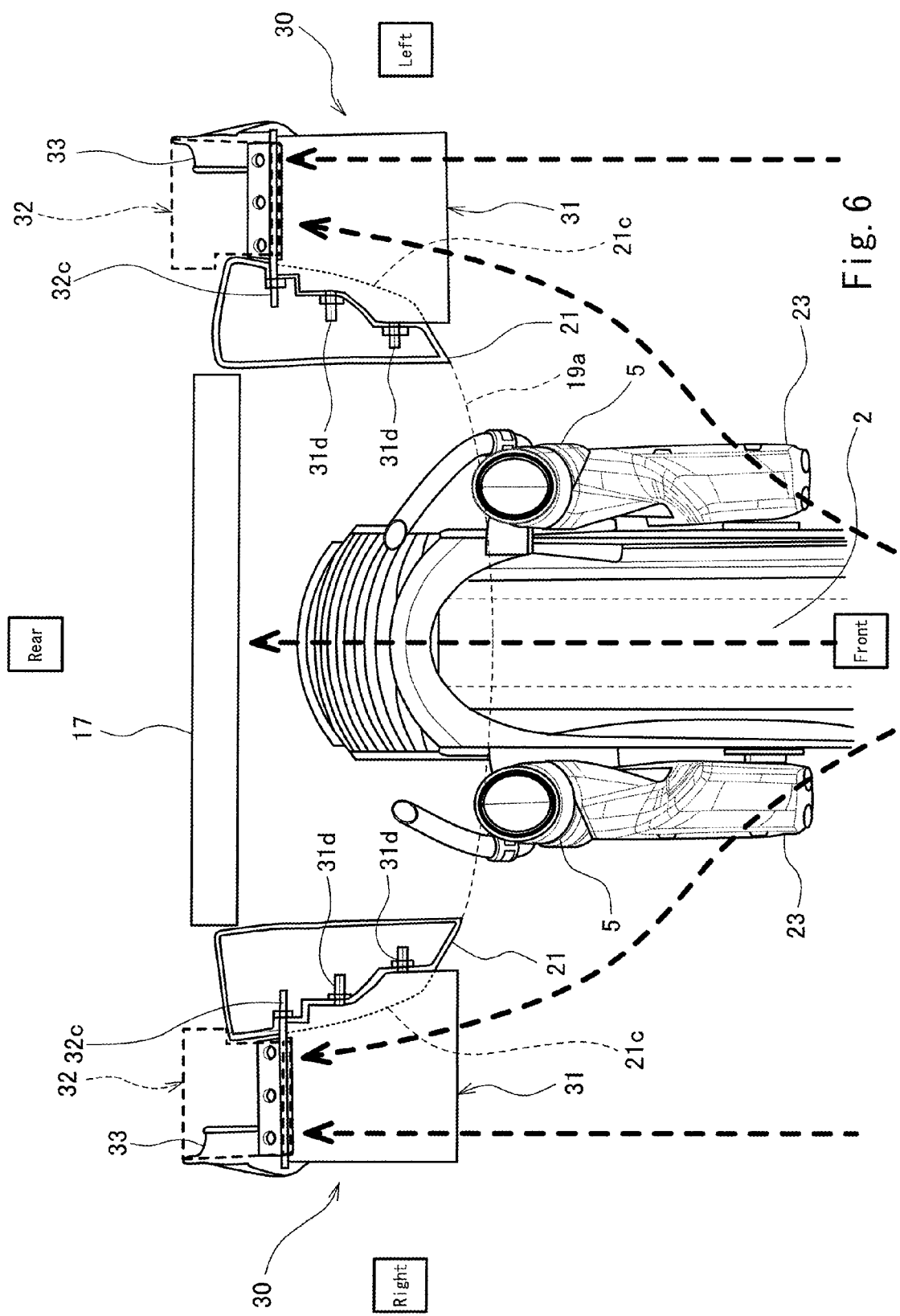

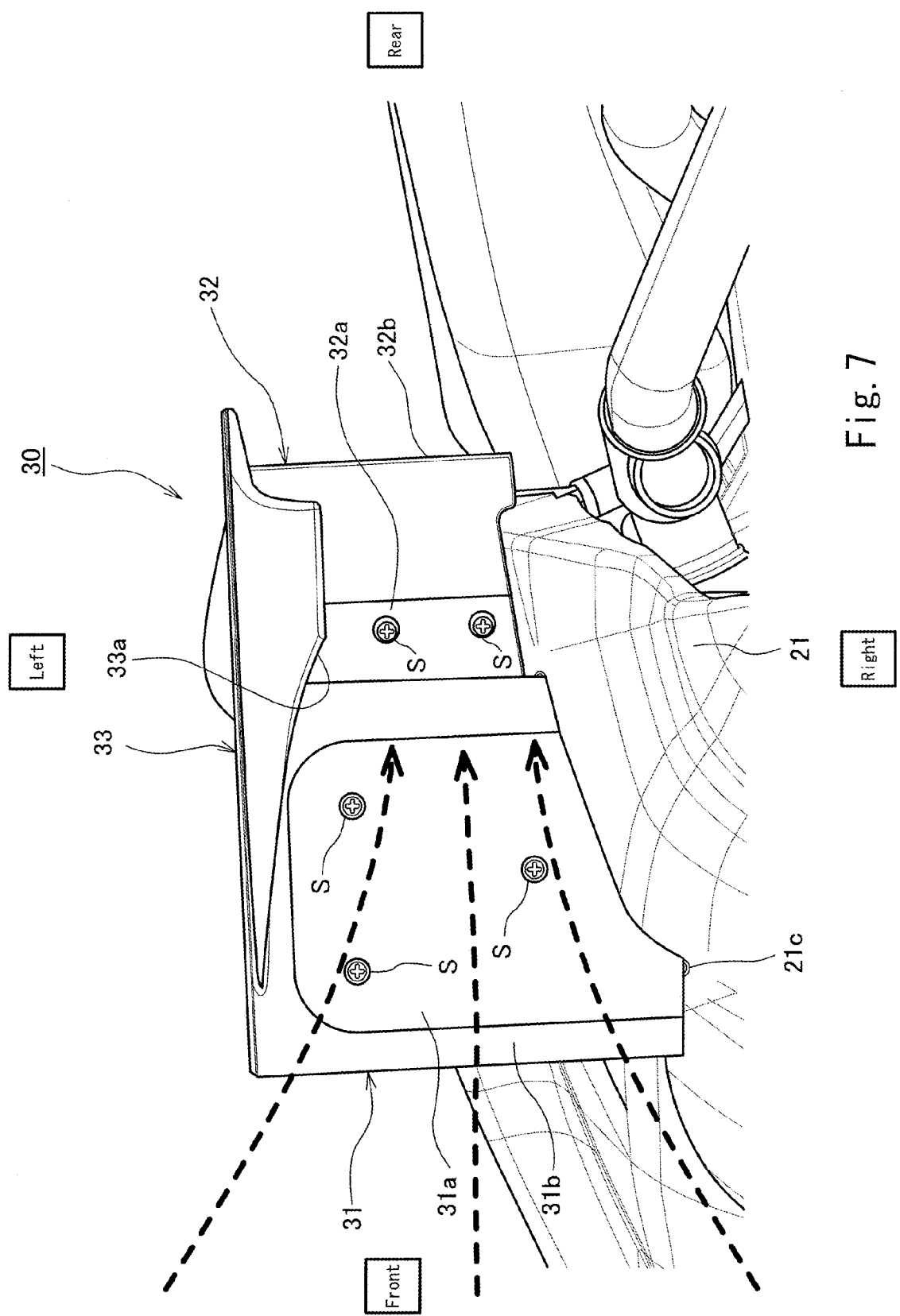

MOTORCYCLE

TECHNICAL FIELD

The present invention relates to a motorcycle including a cowling.

BACKGROUND ART

In a conventional example, a motorcycle includes a cowling of a streamline shape (see, e.g., Patent Literature 1 to Patent Literature 3).

CITATION LIST

Patent Literature

Patent Literature 1: Japanese Laid-Open Patent Application Publication No. 2005-88641
Patent Literature 2: Japanese Laid-Open Patent Application Publication No. 2010-228553
Patent Literature 3: Japanese Utility Model Application Publication No. Sho. 62-178285

SUMMARY OF INVENTION

Technical Problem

The above conventional motorcycle is capable of reducing air resistance with the cowling. In some cases, the motorcycle is required to improve the grounding force of a front wheel on a road surface. For example, a motorcycle designed for a road race drives at a high speed on a paved circuit or a public road. In this motorcycle, the grounding force of the front wheel on the road surface tends to be reduced.

The present invention has been developed to solve the above-stated problem, and an object of the present invention is to provide a motorcycle with excellent grounding force on a road surface.

Solution to Problem

To achieve the above-described object, according to an aspect of the present invention, there is provided a motorcycle comprising: a vehicle body; and a protruding section which is mounted to the vehicle body such that the protruding section protrudes from the vehicle body to at least one of right and left, wherein the protruding section has a structure which causes air to flow from front to back along an upper surface of the protruding section to generate a force for pushing the vehicle body downward.

In this configuration, since the vehicle body is pushed downward, a wheel is pushed on a road surface and the grounding force of the wheel on the road surface can be improved. The present inventors found that airflow is less disordered in the lateral region of the vehicle body. Based on this finding, by utilizing the airflow which is less disordered in the lateral region of the vehicle body, a downforce can be effectively generated, and the grounding force on the road surface can be improved without increasing the dimension of the protruding section excessively. For example, this protruding section may include a blade and have a structure for allowing the air to flow from front to back along the upper surface of the blade.

The protruding section may have a blade cross-sectional shape in which the air flows along the upper surface and a lower surface of the protruding section, and airflow along the lower surface of the protruding section is higher in velocity than airflow along the upper surface of the protruding section.

In this configuration, the force for pushing the vehicle body downward can be generated while suppressing resistance during driving of the motorcycle. For example, the blade cross-sectional shape may be such that its front edge is curved and its rear edge is sharp.

The protruding section may be placed forward relative to a center of gravity of the vehicle body. In this configuration, the grounding force of the front wheel on the road surface can be improved. Thus, the grounding force of the front wheel on the road surface is not reduced during high-speed driving of the motorcycle.

The motorcycle may further comprise a cowling mounted to a side surface of the vehicle body, and the protruding section may be located on the cowling.

In this configuration, the airflow which is less disordered can be utilized in the protruding section. The cowling mounted to the side surface of the vehicle body can prevent the air flowing along the protruding section from flowing inward in the vehicle width direction. For example, the protruding section may be provided on the cowling which serves as a shroud covering a radiator.

A portion of the protruding section may be located in a rear portion of a region of the cowling which region swells outward in a vehicle width direction, from a front portion of the cowling toward a rear portion of the cowling. In this configuration, the air can be guided with a large quantity to the protruding section.

The motorcycle may further comprise: a radiator placed rearward relative to a front wheel, the cowling may have an opening which is located forward relative to the radiator, cover the radiator from outside in a vehicle width direction, guide the air to the radiator, and have a discharge outlet through which the air which has flowed through the radiator is discharged, and the protruding section may be mounted to the cowling and placed forward relative to the discharge outlet.

In this configuration, the air which flows through the outside of the cowling and is less disordered can be utilized in the protruding section, rather than the air discharged from the discharge outlet, while reducing the number of components.

A front end portion of the protruding section may have a shape in which its width increases as the protruding section extends forward, when viewed from above. In this configuration, the air can be guided with a large quantity to the protruding section. For example, the front end portion of the blade as the protruding section may have a shape in which its width increases as the blade extends forward.

The protruding section may include a guide wall protruding downward from an outer end portion of the protruding section in a vehicle width direction. In this configuration, the air can be guided in a large quantity.

The motorcycle may further comprise a front guide member which is placed forward relative to a cowling provided with the protruding section to guide the air outward in a vehicle width direction, and the protruding section may be located between upper and lower ends of the front guide member in a vertical direction.

In this configuration, the air can be guided to the protruding section along the front guide member. For example, the front guide member may be a front fender, or a protective cover covering the lower portion of a front fork from below.

The protruding section may be dividable into a front protruding section and a rear protruding section, and the front protruding section and the rear protruding section may be arranged at a front side and a rear side, respectively such that there is a gap between the front protruding section and the rear protruding section in a travelling direction of the motorcycle.

In this configuration, as compared to a case where the protruding section is a single member, the length of the protruding section in a forward and rearward direction can be reduced, and a good downforce can be produced. As a result, the motorcycle can stably drive at a high speed while suppressing the effects of the protruding section on the rider's operation.

The upper surface of the protruding section may be inclined upward as the upper surface extends rearward. In this configuration, the counteraction of a force generated when the air flows along the upper surface of the protruding section and is deflected, generates a force for pushing the vehicle body downward. More specifically, the upper surface of the protruding section forms an angle of attack with respect to the travelling direction of the motorcycle as the upper surface extends rearward, and the downforce can be further increased by utilizing a push-down force caused by this angle of attack. The shape of the protruding section is not limited to a blade.

Advantageous Effects of Invention

The present invention is configured as described above, and can achieve an advantage that it is possible to provide a motorcycle which can improve a grounding force on a road surface.

The above and further objects and features of the invention will more fully be apparent from the following detailed description and the accompanying drawings.

BRIEF DESCRIPTION OF DRAWINGS

FIG. 6 is a plan view of the blade devices of the motorcycle of FIG. 4, and a region which is in the vicinity of the blade devices.

FIG. 7 is a bottom view of the blade device of the motorcycle of FIG. 4, and a region which is in the vicinity of the blade device.

DESCRIPTION OF EMBODIMENTS

Figure 1:
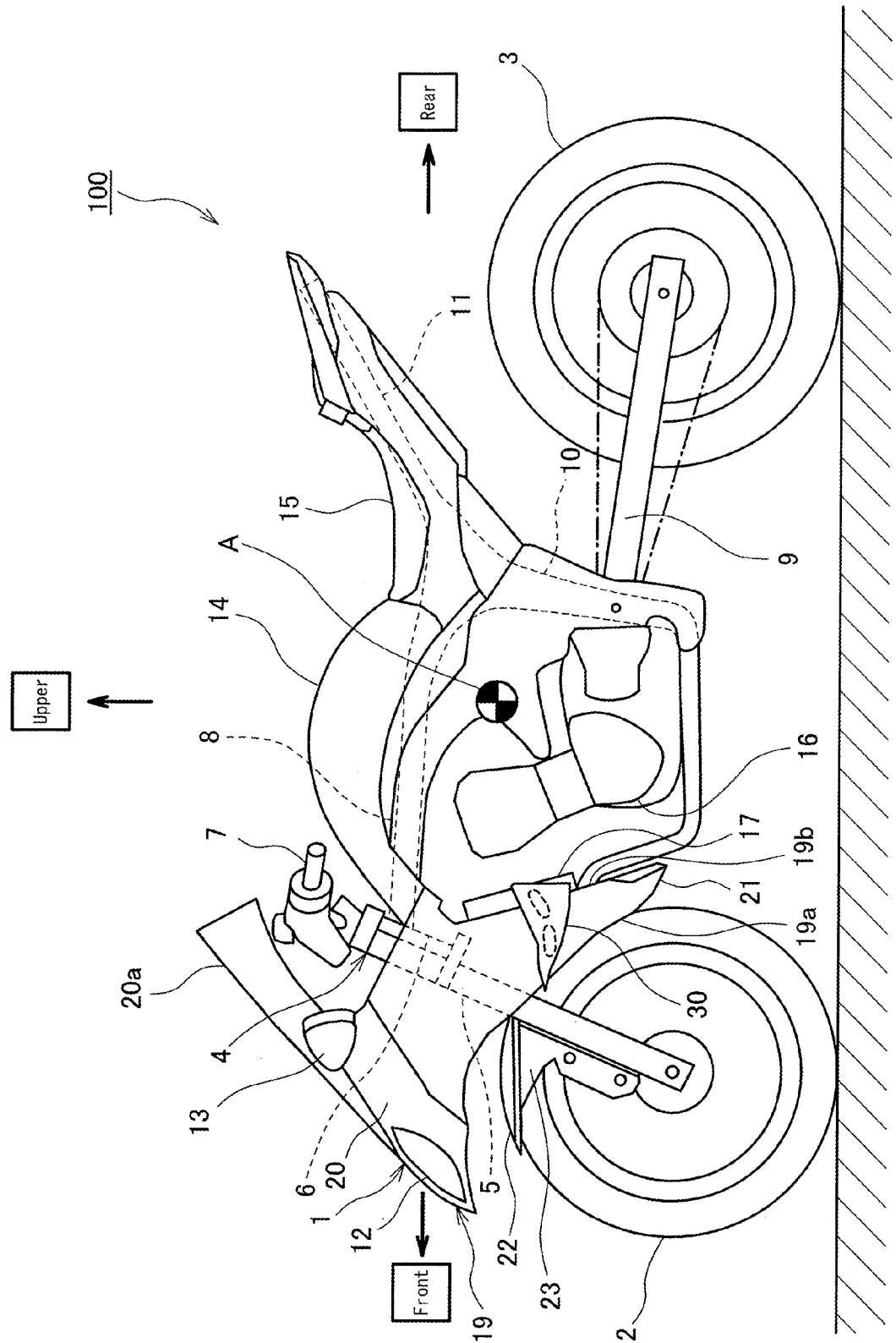
FIG. 1 is a left side view of a motorcycle according to an embodiment.

Hereinafter, the embodiment of the present invention will be described with reference to the accompanying drawings. Hereinafter, the stated directions are referenced from the perspective of a rider straddling a motorcycle. A rightward and leftward direction conforms to the vehicle width direction of a vehicle body. Also, hereinafter, inward in the vehicle width direction of the vehicle body will be referred to as "inward", while outward in the vehicle width direction of the vehicle body will be referred to as "outward".

First of all, a situation in which it is necessary to apply a downforce to the vehicle body of a motorcycle 100 of the present embodiment will be described. In the motorcycle 100, each of right and left side cowlings 21 is inclined outward in the vehicle width direction, from its front end portion to its rear end portion, and thereby diverts air (ram air or travelling wind) flowing toward the rider's legs. The rear end portions of the side cowlings 21 are located in the vicinity of a radiator 17. That air which has flowed through the radiator 17 flows rearward and downward, without interfering with the side cowlings 21. The side cowlings 21 serve to guide the air to the radiator 17. The front ends of the inner side surfaces of the side cowlings 21 in the vehicle width direction are located forward relative to the radiator 17. The upper portion of the space formed between the right and left cowlings 21 is closed by a head light 12, a front cowling 20, and the like. An opening 19a is provided between the right and left side cowlings 21. Through the opening 19a, the air flowing from in front of the vehicle can be introduced into the vehicle body 1. The radiator 17 is disposed between the right and left side cowlings 21 and rearward relative to the front end portions of the side cowlings 21. In this structure, the air is introduced through the opening 19a provided between the right and left side cowlings 21 and guided rearward from the front ends of the side cowlings 21 to the radiator 17, without flowing outward in the vehicle width direction.

If the air which is guided in a large quantity to the radiator 17 located in the space formed between the right and left side cowlings 21 during high-speed driving of the motorcycle 100, this air causes a force which raises a front wheel 2 to be generated in the motorcycle 100, which tends to reduce the grounding load of the front wheel 2. In the present embodiment, the front surface of the radiator 17 and the front surface of a cylinder of an engine 16 are inclined rearward as they extend downward. In this structure, the force which raises the front wheel 2 tends to be generated in the motorcycle 100. In the present embodiment, as will be described later, protruding sections 30 are mounted to the side surfaces of the vehicle body 1 to allow the downforce to be generated by the air colliding with the upper surfaces of the protruding sections 30. In this way, a force pushing the vehicle body and the protruding section 30 downward is generated. As a result, during high-speed driving of the motorcycle 100, reduction of the grounding load of the front wheel 2 can be suppressed, and a driving force and a braking force can be easily transmitted from the front wheel 2 to the ground surface. Since the downforce is generated to increase the grounding load of the front wheel 2 irrespective of the air guided to the space formed between the right and left side cowlings 21, the driving force and the braking force which are applied from the front wheel 2 to the road surface can be increased. In this way, driving performance of the motorcycle 100 can be improved.

Hereinafter, the components and the like of the motorcycle 100 will be specifically described.

FIG. 1 is a left side view of the motorcycle 100 according to the embodiment. As shown in FIG. 1, the motorcycle 100 includes a vehicle body 1, the front wheel 2, a rear wheel 3, and the protruding sections 30 mounted to the the vehicle body 1 such that each of the protruding sections 30 protrudes from the vehicle body 1 to the right or to the left.

The vehicle body 1 includes a vehicle body frame 4, a front cowling 20 covering the vehicle body frame 4 from the front, and the pair of right and left side cowlings 21 laterally covering the front portion of the vehicle body frame 4 The vehicle body frame 4 includes a head pipe 6, a pair of right and left main frames 8 extending rearward from the head pipe 6, a pair of right and left pivot frames 10 which extend continuously with the rear portions of the main frames 8, respectively, and to which the front end portions of a swing arm 9 are mounted such that the swing arm 9 is pivotable, and a pair of right and left seat rails 11 extending rearward from the pivot frames 10, respectively.

The front cowling 20 is mounted to the front portion of the vehicle body frame 4 to cover the vehicle body 1 from the front. The right and left side cowlings 21 are placed behind and continuously with the front cowling 20. The side cowlings 21 are mounted to the front portion of the vehicle body frame 4 to cover the vehicle body 1 from laterally. The front cowling 20 and the side cowlings 21 have a streamline shape, and fair the air flowing along the vehicle body 1, to reduce an air resistance. A wind shield 20a is provided on the upper portion of the center of the front cowling 20. A head lamp 12 is attached to the front portion of the front cowling 20. A pair of right and left side mirrors 13 are attached to the side portions of the front cowling 20.

The front wheel 2 is rotatably mounted to the lower end portions of front forks 5 extending substantially vertically. The front forks 5 are attached to a steering shaft (not shown) via an upper bracket (not shown) attached on upper end portions thereof. In addition, the front forks 5 are attached with a front fender 22 which covers the upper portion of the front wheel 2 from above. Fork guard sections 23 are placed forward relative to the front forks 5 to prevent entry of foreign matters into the front forks 5, respectively. The steering shaft (not shown) is rotatably supported by the head pipe 6. A bar-type steering handle 7 extending in the rightward and leftward direction is attached to the upper bracket. By rotating the steering handle 7, the rider can turn the direction of the front wheel 2 in a desired direction around the steering shaft which is a rotary shaft. A fuel tank 14 is placed behind the steering handle 7 and fastened to the main frames 8. A riding seat 15 is mounted to the rear side of the fuel tank 14.

The engine 16 is disposed between the front wheel 2 and the rear wheel 3 in a state in which the engine 16 is mounted to the main frames 8 and the pivot frames 10. The radiator 17 which is inclined forward is disposed behind the front wheel 2 and obliquely above the engine 16. The engine 16 has a cooling structure which causes cooling water to be circulated between the radiator 17 and a water jacket (not shown) so that heat is radiated from the cooling water in the radiator 17. The radiator 17 is covered with the side cowlings 21 which serve as shrouds.

Figure 2:
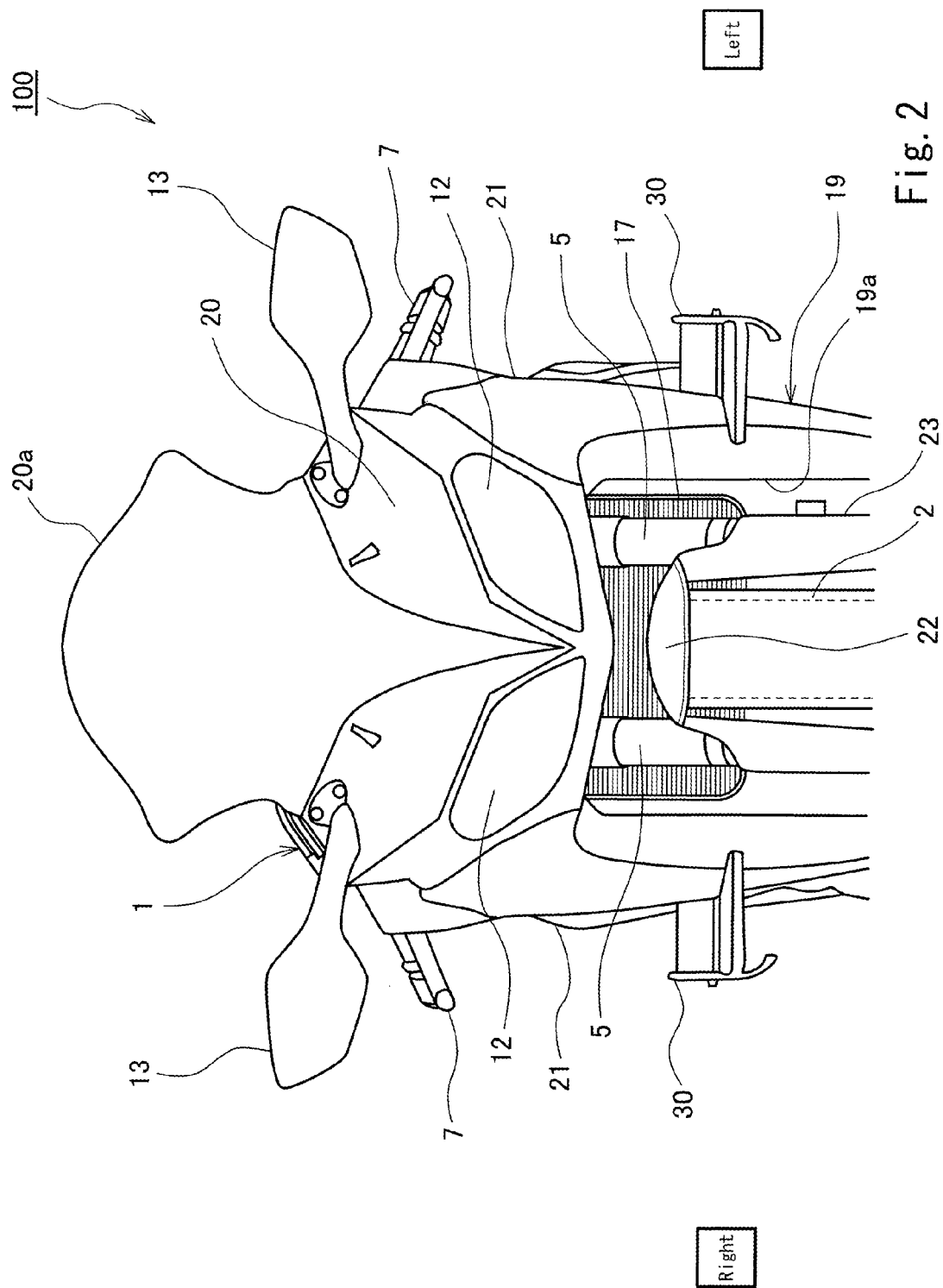
FIG. 2 is a front view of the motorcycle of FIG. 1.

Hereinafter, FIG. 2 will also be referenced to, in addition to FIG. 1. FIG. 2 is a front view of the motorcycle of FIG. 1. As shown in FIG. 2, the side cowlings 21 are placed at the right and left sides of the front cowling 20, respectively, and a cowling 19 including the front cowling 20 and the side cowlings 21 entirely has an inverted-recess shape when viewed from the front. The cowling 19 has the opening 19a at a front side thereof, in a location that is forward relative to the radiator 17. The cowling 19 is configured to cover the front space of the radiator 17 from outside in the vehicle width direction and guide the air flowing from the front to the radiator 17. With the air flowing through the radiator 17, the radiator 17 cools the cooling water of the engine 16. The cowling 19 has a discharge outlet 19b at a rear side thereof, to discharge the air which has flowed through the radiator 17 (see FIG. 1).

The motorcycle 100 includes the protruding sections 30 mounted to the vehicle body 1 such that they protrude from the vehicle body 1 to the right and to the left, respectively. The protruding sections 30 are disposed forward relative to a center of gravity A of the vehicle body 1. In the present embodiment, the protruding sections 30 are placed at the side cowlings 21 mounted to the side surfaces of the vehicle body 1, respectively. The protruding sections 30 protrude from the side cowlings 21, respectively, in a location that is forward relative to the engine 16. Therefore, the protruding sections 30 do not contact the knees of the rider straddling the vehicle body 1 and therefore do not affect the the rider's operation. The protruding sections 30 are mounted to the right and left side cowlings 21 such that they are laterally symmetric in the rightward and leftward direction. The right and left protruding sections 30 are equal in weight. Therefore, the protruding sections 30 do not affect the balance of the vehicle body 1 during driving of the motorcycle 100.

The protruding sections 30 are positioned below the head lamp 12 attached to the front portion of the front cowling 20. The protruding sections 30 are positioned below the upper edge of the opening 19a of the cowling 19 (i.e., lower edge of the front cowling 20).

The motorcycle 100 includes front guide members which are spaced apart from the side cowlings 21, respectively, and forward relative to the protruding sections 30 to guide the air outward in the vehicle width direction. In the present embodiment, used as the front guide members, are fork guard sections 23 which are placed forward relative to the front forks 5, respectively to prevent entry of foreign matters into the front forks 5. In the present embodiment, the fork guard sections 23 are secured to the axle support member of the front wheel 2 together with the front fender 22. Each of the fork guard sections 23 has an inclined surface extending outward in the vehicle width direction, from its front end to its rear side and covering the front fork 5 from the front to guide the air flowing toward the front fork 5 outward in the vehicle width direction. This allows the air to be guided to the protruding sections 30 along the fork guard sections 23. The protruding sections 30 are placed between the upper and lower ends of the fork guard sections 23 in a vertical direction. Alternatively, the front guide members may be the front fender 22 located at the upper portion of the front wheel 2.

When viewed from the front, the protruding sections 30 are located outward in the rightward and leftward direction, relative to the opening 19a located forward relative to the radiator 17 and between the upper and lower ends of the opening 19a in the vertical direction. In the present embodiment, the protruding sections 30 are mounted to the side cowlings 21, respectively, extending in a substantially vertical direction and in the forward and rearward direction, of the cowling 19. The front guide members preferably include portions which are placed inward in the vehicle width direction relative to the protruding sections 30 and are located as high as the protruding sections 30 when viewed from the front.

Next, the configuration of the protruding section 30 will be specifically described.

Figure 3:
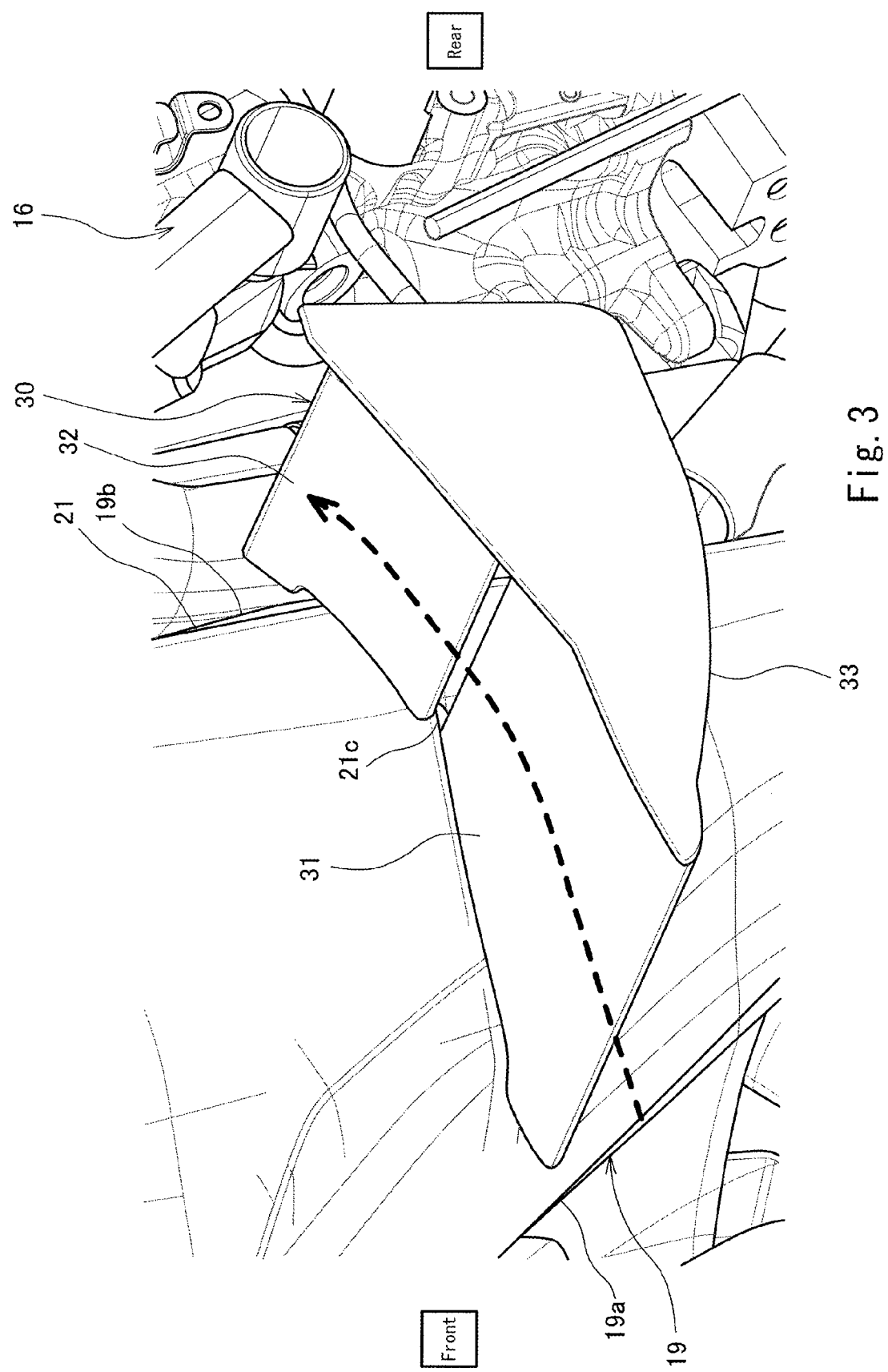
FIG. 3 is a perspective view of a blade device (protruding section) at the left side of the motorcycle of FIG. 2, and a region which is in the vicinity of the blade device.

FIG. 3 is a perspective view of the protruding section 30 at the left side of the motorcycle of FIG. 2. As shown in FIG. 3, the protruding section 30 has a blade shape (plate shape) having upper and lower surfaces. Hereinafter, the protruding section 30 will described as a blade device 30. The blade device 30 includes a front blade 31 protruding laterally from the side cowling 21, a rear blade 32 protruding laterally from the side cowling 21 in a location that is behind the front blade 31, and a guide wall 33 protruding downward from the outer end portion of the front blade 31 in the vehicle width direction and the outer end portion of the rear blade 32 in the vehicle width direction.

As shown in FIG. 1, the blade device 30 is placed forward relative to the center of gravity A of the vehicle body. Therefore, the grounding force of the front wheel 2 on the road surface can be improved, and reduction of the grounding force of the front wheel 2 on the road surface can be prevented during high-speed driving of the motorcycle 100. In the present embodiment, the front blade 31, the rear blade 32, and the guide wall 33 are covered with resin, and have a smooth shape which allows the air to easily flow along them.

In the present embodiment, the side cowling 21 has a recess 21c which is provided on the outer side surface thereof and recessed inward in the vehicle width direction. As will be described later with reference to FIG. 6, the inner end portion of the front blade 31 in the vehicle width direction is inserted into the recess 21c.

The engine 16 and surrounding components are placed rearward relative to the discharge outlet 19b of the cowling 19. Since the surfaces of the engine 16 and of the components are not aligned, the flow of the discharged air is disordered. To prevent this, most of the blade device 30 is placed forward relative to the discharge outlet 19b of the cowling 19. The rear end portion of the rear blade 32 is located rearward relative to the discharge outlet 19b of the cowling 19. In other words, the rear end portion of the blade device 30 protrudes rearward farther than the cowling 19. In this structure, the air which flows through the outward region of the cowling 19 and is less disordered can be utilized to improve the grounding force on the road surface, rather than the air discharged from the discharge outlet 19b, while reducing the number of components for fairing the air flow.

Figure 4:
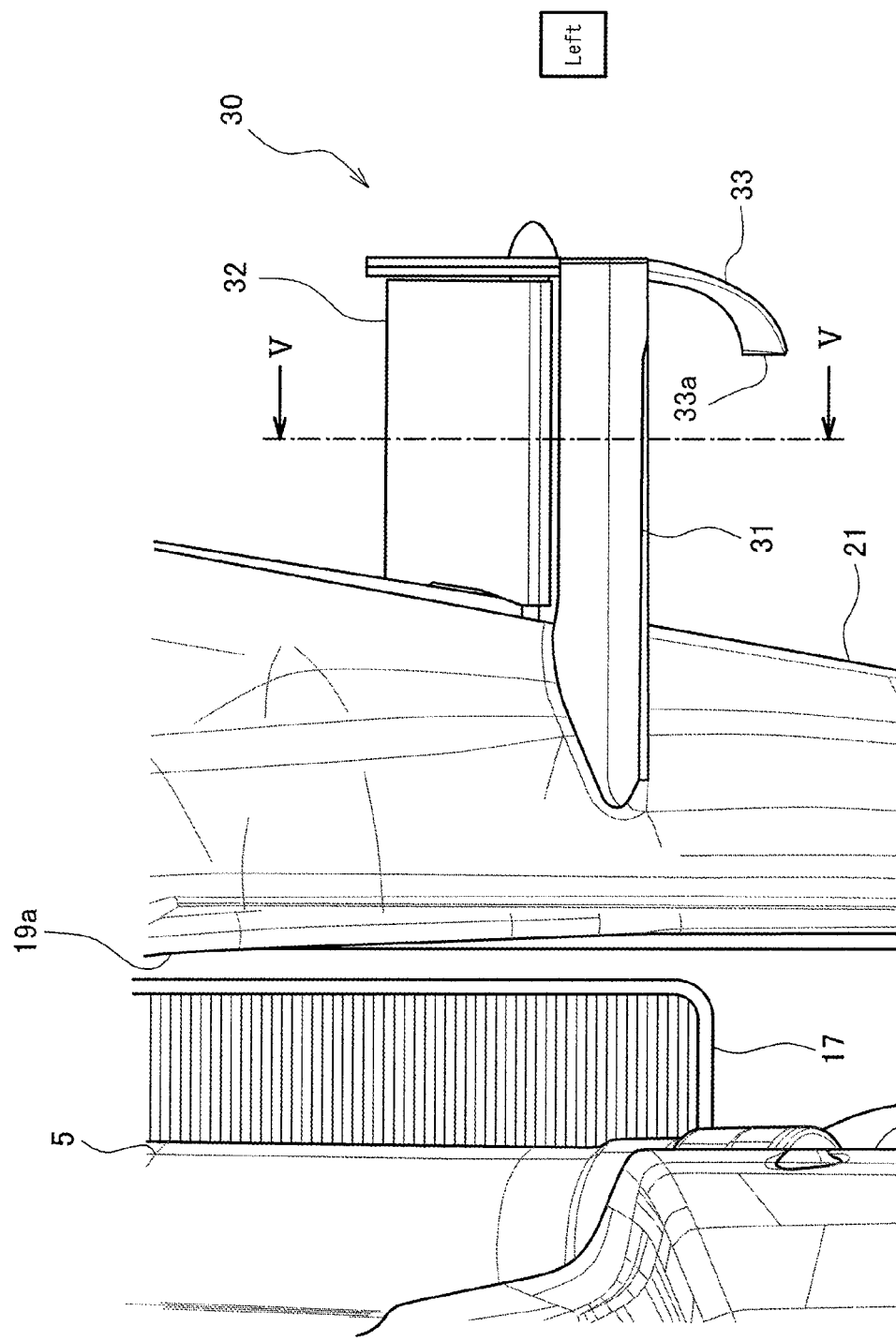
FIG. 4 is a front view of the blade device of the motorcycle of FIG. 3, and a region which is in the vicinity of the blade device.

FIG. 4 is a front view of the blade device 30 of FIG. 3. As shown in FIG. 4, the guide wall 33 protrudes downward from the outer end portion of the front blade 31 in the vehicle width direction and the outer end portion of the rear blade 32 in the vehicle width direction. The lower edge 33a of the guide wall 33 is curved inward in the vehicle width direction (toward the side cowling 21). In this configuration, the side cowling 21 and the guide wall 33 serve as a pair of blade end plates located at the right and left ends of the front blade 31 and of the rear blade 32, respectively. Specifically, the outer side surface of the side cowling 21 and the inner side surface of the guide wall 33 are able to capture the air flowing along the lower surfaces of the blades 31, 32 (direction from an obverse side toward a reverse side of the sheet of FIG. 4) to prevent the air from escaping from the lower surfaces of the blades 31, 32. In this way, the downforce can be efficiently produced.

Figure 5:
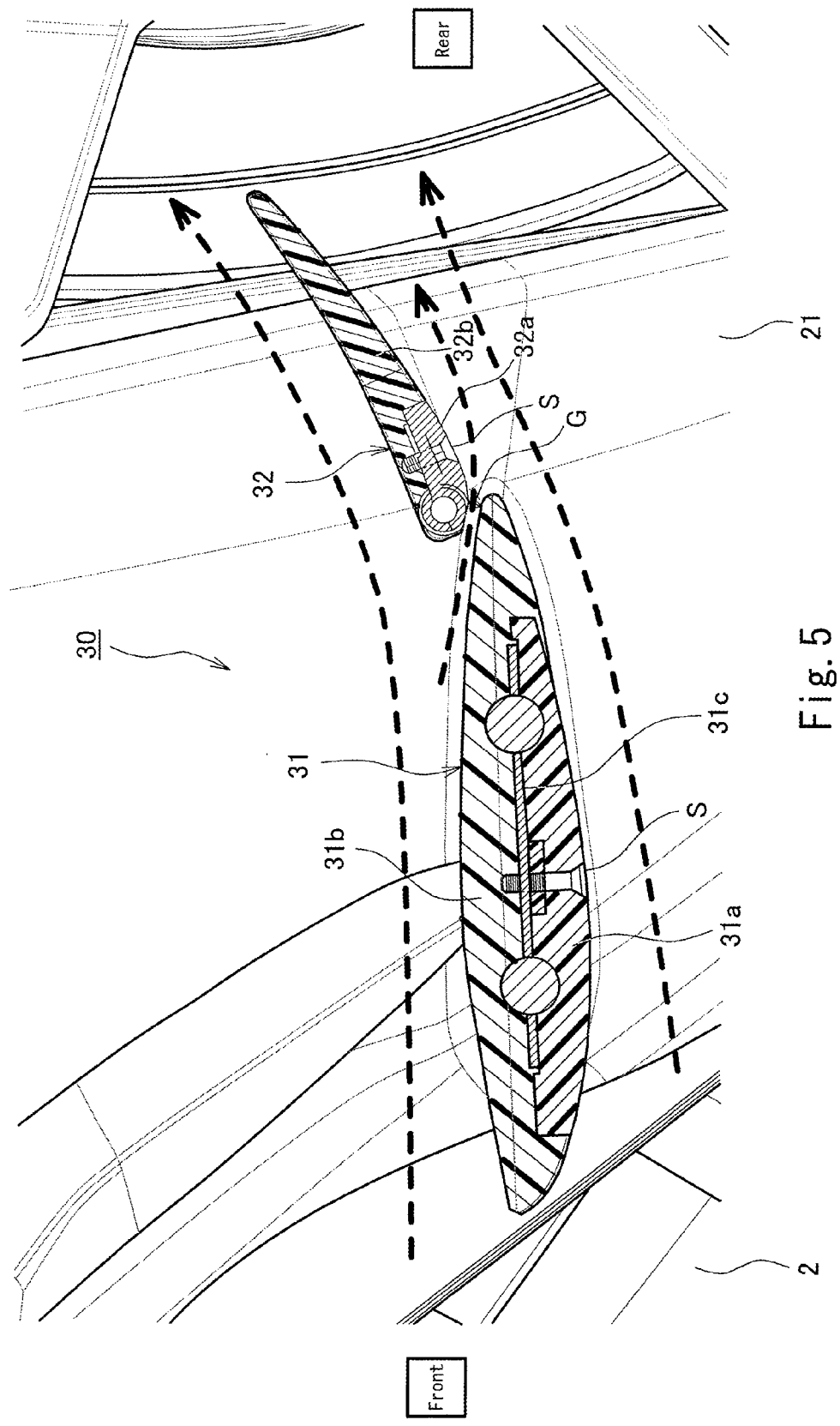
FIG. 5 is a cross-sectional view taken along a line V-V of FIG. 4.

FIG. 5 is a cross-sectional view of the blade device 30 of the motorcycle of FIG. 4, taken along a line V-V of FIG. 4. As shown in FIG. 5, in the present embodiment, each of the front blade 31 and the rear blade 32 has a cross-section of a substantially blade shape in which its front edge is curved and its rear edge is sharp as compared to the front edge. Each of the front blade 31 and the rear blade 32 has a cross-section in which the length of the lower surface in the forward and rearward direction is larger than the length of the upper surface in the forward and rearward direction. Each of the front blade 31 and the rear blade 32 is designed so that the air flows along the upper and lower surfaces (as indicated by dotted-line arrows of FIG. 5) and the airflow along the lower surface is higher in velocity than the airflow along the upper surface. That is, each of the front blade 31 and the rear blade 32 is designed so that the shape of a wing for generating lift is reversed in the vertical direction. With this shape, the downforce for pushing the vehicle body 1 downward can be produced by utilizing a pressure difference between the upper and lower sides of each of the blades 31, 32. Since the vehicle body 1 is pushed downward, the front wheel 2 is pushed on the road surface and the grounding force of the front wheel 2 on the road surface can be improved.

The front blade 31 and the rear blade 32 are arranged at the front and at the rear, respectively, such that a gap G is formed between them in the travelling direction of the motorcycle 100. In this structure, a portion of the air which has flowed along the upper surface of the front blade 31 flows through the gap G and joins the air flowing along the lower surface of the rear blade 32. In addition, in the present embodiment, the front end portion of the rear blade 32 is located above the rear end portion of the front blade 31, and therefore the front end portion of the rear blade 32 overlaps with the rear end portion of the front blade 31, when viewed from a side. This allows a portion of the air which has flowed along the upper surface of the front blade 31 to be easily guided to the lower surface of the rear blade 32 through the gap G. Therefore, the velocity of the air flowing along the lower surface of the rear blade 32 can be easily made higher than that of the air flowing along the upper surface of the rear blade 32. As compared to a case where the gap G is not provided between the front and rear blades, it becomes possible to efficiently generate the downforce while preventing an excessive increase in the width or length of the blade. In other words, as compared to a case where the blade is a single member, the width of the blades can be reduced, and thus the effects of the blades on the rider's operation can be suppressed. Furthermore, the protruding length of the blade can be reduced, and the bank angle of the vehicle body 1 can be made sufficiently large.

The upper surface of the blade device 30 is an inclined surface which is inclined upward as it extends rearward. In the present embodiment, the upper surface of the rear blade 32 is inclined upward as it extends rearward. Specifically, the rear end of the rear blade 32 is located above the front end of the rear blade 32. In this structure, the counteraction of a force generated when the air (see dotted-line arrow of FIG. 3) flows from front to back along the upper surface of the rear blade 32 and is deflected generates a force for pushing the upper surface of the rear blade 32 downward. More specifically, the upper surface of the blade device 30 forms an angle of attack with respect to the travelling direction of the motorcycle 100 as it extends rearward, and the downforce can be further increased by utilizing a push-down force caused by this angle of attack.

The inclination angle of a virtual line connecting the front end of the front blade 31 to the rear end of the front blade 31, with respect to a horizontal line, is smaller than the inclination angle of a virtual line connecting the front end of the rear blade 32 to the rear end of the rear blade 32, with respect to the horizontal line. This can reduce a resistance caused by contact of the air flow with the front blade 31. As a result, the blade device 30 as whole can suppress a resistance due to the air flow, while producing the force for pushing the upper surface of the rear blade 32 downward with the rear blade 32.

The front blade 31 includes a core metal 31c which is made of metal and has a flat plate shape, a lower member 31a which is made of resin and covers the lower side of the core metal 31c, and an upper member 31b which is made of resin and covers the upper side of the core metal 31c. The core metal 31c, the lower member 31a, and the upper member 31b of the front blade 31 are fastened to each other by using screws S from below. The rear blade 32 includes a core metal 32a which is made of metal, and a blade body 32b which is made of resin and covers the core metal 32a. The core metal 32a constitutes a portion of the lower surface of the rear blade 32. The core metal 32a and the blade body 32b of the rear blade 32 are fastened to each other by using screws S from below.

FIG. 6 is a plan view of the blade devices 30 of the motorcycle 100 of FIG. 4. As shown in FIG. 6, the pair of right and left side cowlings 21 are mounted to the end portions of the support member (not shown) extending in the vehicle width direction, respectively. The air (dotted-line arrows of FIG. 6) flowing from the front toward the vehicle body 1 of the motorcycle 100 is introduced into the opening 19a of the cowling 19, guided outward in the vehicle width direction along the right and left fork guard sections 23 covering the lower portions of the front forks 5, and faired by the outer side surfaces of the side cowlings 21. Since the blade devices 30 are mounted to the side cowlings 21, respectively, the airflow which is less disordered can be utilized in the blade devices 30. Also, the side cowlings 21 can prevent the air flowing along the blade devices 30 from flowing inward in the vehicle width direction.

In the present embodiment, a portion of each of the blade devices 30 is located in the rear portion of a region of the corresponding side cowling 21, which region swells outward in the vehicle width direction, from the front portion of the side cowling 21 toward the rear portion of the side cowling 21. The front blade 31 of the blade device 30 has a shape in which its width increases as it extends forward, when viewed from above. With the above configuration, a large quantity of the air can be guided to the blade device 30.

In the present embodiment, the right and left front blades 31 are mounted to the side cowlings 21, respectively, in such a manner that the inner ends in the vehicle width direction are inserted into the recesses 21c provided on the outer side surfaces of the side cowlings 21, respectively, and extend in the forward and rearward direction. In this structure, the inner end portions of the right and left blade devices 30 to which the downforce is applied can be stably supported by the recesses 21c of the side cowlings 21, respectively. A plurality of stud bolts 31d are attached to the inner end portion of the core metal 31c of each of the front blades 31, in the vehicle width direction. The tip ends of these stud bolts 31d are inserted into holes of the recess 21c of the corresponding side cowling 21 and fastened by nuts, respectively, on the inner side of the side cowling 21. In the above-described manner, the blade device 30 is supported by the recess 21c of the side cowling 21 and fastened to the side cowling 21 by using the stud bolts 31d. Therefore, the blade device 30 is able to withstand a vertical force generated on the upper and lower surfaces of the blades.

Each of the right and left rear blades 32 (dotted lines of FIG. 6) has a stud bolt 32c protruding inward in the vehicle width direction, of the core metal 32a of the rear blade 32. The stud bolt 32c penetrates the front end portion of the core metal 32a and is fastened to the core metal 32a. The stud bolt 32c is also inserted into the hole of the recess 21c of the side cowling 21 and fastened by the nut on the inner side of the side cowling 21.

FIG. 7 is a bottom view of the blade device 30 of the motorcycle of FIG. 4. As shown in FIG. 7, the core metal 31c, the lower member 31a and the upper member 31b of the front blade 31 are fastened to each other in plural locations by using the screws S from below. The core metal 32a and the blade body 32b of the rear blade 32 are fastened to each other in plural locations by using the screws S from below. The lower edge 33a of the guide wall 33 is curved inward (toward the side cowling 21) as it extends rearward. The width of each of the blades 31, 32 decreases as it extends rearward, whereas the lower edge 33a of the guide wall 33 protrudes with a larger amount as it extends rearward. In this structure, a large quantity of the air (see dotted-line arrows of FIG. 7) can be guided along the guide wall 33 and is throttled. Because of the Venturi effect, the velocity of the airflow along the lower surfaces of the blades 31, 32 can be increased. In this way, an effective downforce can be produced.

In the present embodiment, the protruding section 30 is located between the upper and lower ends of the radiator 17 in the vertical direction and overlaps with the radiator 17, when viewed from a side (see FIG. 1). The vehicle body 1 is designed to form a path wherein the air which has flowed through the protruding section 30 joins the air which has flowed through the radiator 17. This facilitates the airflow through the radiator 17 (see FIG. 6). For example, the vehicle body 1 may be designed so that the direction of the air which has flowed through the protruding section 30 and is deflected conforms to or is close to the direction that is perpendicular to the radiator 17.

The protruding section 30 is placed below the front end of the front cowling 20. This makes it possible to prevent a situation in which the airflow disordered by the front cowling 20 is guided to the protruding section 30. Thus, the airflow which is less disordered can be guided to the protruding section 30. In the present embodiment, the protruding section 30 is placed below the upper end portion of the front wheel 2 (see FIG. 1).

The blade device (protruding section) 30 includes stiff members (e.g., the core metal 31c and the stud bolt 31d of the blade 31) which are formed of a highly stiff material such as metal. These stiff members are fastened to the cowling 19 (e.g., the side cowling 21) or the cowl support member (e.g., the vehicle body frame 4). Since the blade device (protruding section) 30 is directly coupled to the cowling 19 (e.g., the side cowling 21) or the cowl support member (e.g., vehicle body frame 4), vibration of the blade device 30 can be prevented.

The stiff members of the blade device (protruding section) 30 are covered with lightweight members (e.g., the lower member 31a and the upper member 31b of the front blade 31, and the rear blade body 32b) which are formed of a material which is lower in stiffness and lighter in weight than the stiff members. This allows the blade device 30 to reduce its weight while ensuring required support stiffness. If molded members are used as the lightweight members, a smooth surface shape can be easily formed.

Since the blades of the blade device (protruding section) 30 are provided adjacently to the cowling 19, the blade device 30 can receive the air flowing from front to back along the cowling 19, and the downforce can be suitably produced as compared to a case where the blade device (protruding section) 30 is apart from the cowling 19 in the vehicle width direction.

Since each of the front blade 31 and the rear blade 32 has a cross-section in which the length of the lower surface in the forward and rearward direction is larger than the length of the upper surface in the forward and rearward direction, a great pressure difference is generated between the upper and lower surfaces of each of the blades 31, 32, and the downforce can be effectively produced. In the case of the blade having the cross-section in which the upper and lower sides are reversed with respect to the wing for generating lift when viewed from the side, a stabilized downward force can be effectively secured.

Since the right and left blade devices (protruding sections) 30 are mounted to the outer side surfaces of the side cowlings 21, respectively, the air flowing stably along the outer surfaces of the side cowlings 21 can be utilized in the blade device 30. Thus, the downforce can be effectively generated by the blades.

The side cowlings 21 have the recesses on the outer side surfaces, respectively, and the right and left blade devices (protruding sections) 30 are mounted to the side cowlings 21, respectively, in such a manner that the inner end portions of the right and left blade devices (protruding sections) 30 in the vehicle width direction are inserted into the recesses 21c, respectively. Therefore, the inner end portions of the right and left blade devices 30 to which the downforce is applied can be stably supported by the recesses 21c of the side cowlings 21, respectively.

Since the lower end portion of the guide wall 33 is curved inward in the vehicle width direction (see FIG. 4), the air flowing along the lower surfaces of the blades can be captured so that the air does not escape from the lower surfaces. Therefore, the downforce can be produced more effectively.

Other Embodiments

Although in the present embodiment, the protruding sections 30 are provided at the right and left sides, respectively, the protruding section 30 may be provided at only one of the right and left sides. If the weight of a portion of the vehicle body 1 which is at one of the right and left sides in the vehicle width direction, except for the protruding section 30, is larger than that of a portion of the vehicle body 1 which is at the other side in the vehicle width direction, the weight of the protruding section 30 at the other side may be made larger than that of the protruding section 30 at one side, to keep the balance of the vehicle body 1 in the vehicle width direction.

The downforce may be produced by utilizing a pressure difference in airflow between the upper and lower surfaces of the front blade 31 and of the rear blade 32. Or, the downforce may be produced in such a manner that the airflow colliding with the front blade 31 and the rear blade 32 causes a force which pushes the front blade 31 and the rear blade 32 downward.

Although in the motorcycle 100 of the present embodiment, the protruding sections 30 are mounted to the side cowlings 21 attached to the side surfaces of the vehicle body 1, the present invention is not limited to this. For example, in the case of a motorcycle which does not include the side cowlings 21, the protruding sections 30 may be mounted to the side surfaces of the vehicle body frame 4.

Although in the present embodiment, the blade devices 30 are fastened to the side cowlings 21, respectively, the present invention is not limited to this. For example, the blade devices 30 may be removably mounted to the side cowlings 21, respectively, as necessary. If the blade devices 30 are removably mounted to the cowling 19, convenience can be improved. Also, if the blade device (protruding section) 30 is damaged (broken), it can be repaired without a need to replace the cowling 19. Or, in a case where plural kinds of blade devices 30 are prepared, the blade devices 30 according to the rider's preference may be used. Or, in a case where the blade devices 30 are not mounted to the side cowlings 21, respectively, the recesses 21c of the side cowlings 21 may be closed by plate members which are similar in color to the side cowlings 21, respectively.

The blades 31, 32 as a whole have an angle of attack, or only the rear portions of the blades 31, 32 may have an angle of attack.

In the present embodiment, the locations of the blade devices 30 are not particularly limited so long as the blade devices 30 are mounted to the sides of the vehicle body 1. For example, the blade devices 30 may be located rearward relative to the riding seat 15, or the opening 19a of the cowling 19.

Although in the present embodiment, the front and rear blades 31, 32 are fastened at a predetermined angle with respect to the travelling direction of the motorcycle 100, the front blade 31 or the rear blade 32 may be movable. In that case, the inclination angle of the blades with respect to the travelling direction of the motorcycle 100 may be changeable.

Although in the present embodiment, the blades are configured such that the metal plates are covered with resin, the blades may be entirely formed of FRP (fiber reinforced plastic). Or, the metal plate and the resin of each of the blades may be integrated by using FRP.

Numerous improvements and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention is effectively applicable to a motorcycle including a cowling of a streamline shape which fairs air flowing from the front and along a vehicle body.

REFERENCE CHARACTER LIST 1 vehicle body
2 front wheel
3 rear wheel
4 vehicle body frame
17 radiator
20 front cowling
21 side cowling
22 front fender
23 fork guard section (front guide member)
30 blade device (protruding section)
31 front blade
32 rear blade
33 guide wall (blade end plate)
100 motorcycle

The invention claimed is:
1. A motorcycle comprising:
a vehicle body;
a cowling mounted to a side surface of the vehicle body; and
a protruding section which is mounted to a side surface of the cowling such that the protruding section protrudes from the vehicle body to at least one of right and left,
wherein the protruding section includes a blade-shaped portion which has an upper surface and a lower surface and causes air to flow from front to back along the upper surface and the lower surface to generate a force for pushing the vehicle body downward by a pressure difference of the air between upper and lower sides of the protruding section, and a guide wall which protrudes from an outer end portion of the blade-shaped portion in a vehicle width direction and is located outward in the vehicle width direction relative to both the blade-shaped portion and the cowling and apart from the cowling.

2. The motorcycle according to claim 1, wherein a portion of the protruding section is located in a rear portion of a region of the cowling which region swells outward in the vehicle width direction, from a front portion of the cowling toward a rear portion of the cowling.

3. The motorcycle according to claim 1, further comprising:
a radiator placed rearward relative to a front wheel, wherein the cowling has an opening which is located forward relative to the radiator, covers the radiator from outside in the vehicle width direction, guides the air to the radiator, and has a discharge outlet through which the air which has flowed through the radiator is discharged, and
wherein the protruding section is placed forward relative to the discharge outlet, and located between upper and lower ends of the radiator in a vertical direction.

4. The motorcycle according to claim 1, wherein a front end portion of the protruding section has a shape in which its width increases as the protruding section extends forward, when viewed from above.

5. The motorcycle according to claim 1, wherein a lower end portion of the guide wall is curved inward in the vehicle width direction.

6. The motorcycle according to claim 1, further comprising:
a front guide member which is placed forward relative to the cowling provided with the protruding section to guide the air outward in the vehicle width direction, wherein the protruding section is located between upper and lower ends of the front guide member in a vertical direction.

7. A motorcycle comprising:
a vehicle body;
a cowling mounted to a side surface of the vehicle body; and
a protruding section which is mounted to the cowling such that the protruding section protrudes from the vehicle body to at least one of right and left,
wherein the protruding section has a structure which causes air to flow from front to back along an upper surface of the protruding section to generate a force for pushing the vehicle body downward, and a guide wall protruding downward from an outer end portion of the protruding section in a vehicle width direction,
wherein the protruding section is divided into a front protruding section and a rear protruding section, and
wherein the front protruding section and the rear protruding section are arranged at a front side and a rear side, respectively, such that there is a gap between the front protruding section and the rear protruding section in a travelling direction of the motorcycle.

8. The motorcycle according to claim 1, wherein the upper surface of the protruding section is inclined upward as the upper surface extends rearward.

9. The motorcycle according to claim 1, wherein a portion of the protruding section is located in a region of the cowling which region swells outward in the vehicle width direction as the cowling extends rearward, and
wherein the portion of the protruding section has a width which decreases as the portion extends rearward.

10. The motorcycle according to claim 1, comprising:
a radiator placed rearward relative to a front wheel, wherein the cowling has an opening which is located forward relative to the radiator, covers the radiator from outside in the vehicle width direction, and guides the air to the radiator,
wherein the protruding section is located between upper and lower ends of the radiator in a vertical direction.

11. The motorcycle according to claim 1, wherein the guide wall protrudes downward from the outer end portion of the blade-shaped portion in the vehicle width direction.

12. A motorcycle comprising:
a vehicle body;
a front fork;
a cowling mounted to a side surface of the vehicle body; and
a protruding section which is mounted to a side surface of the cowling such that the protruding section protrudes from the vehicle body to at least one of right and left,
wherein the protruding section has a structure which causes air to flow from front to back along an upper surface of the protruding section to generate a force for pushing the vehicle body downward, and a guide wall which protrudes downward from an outer end portion of the structure in a vehicle width direction and is located outward in the vehicle width direction relative to both the structure and the cowling and apart from the cowling, and
wherein the protruding section is mounted to the cowling at a location that is rearward relative to the front fork.

* * * * *